W. I. HARP.
NON-SKID CHAIN TIGHTENER AND ADJUSTER.
APPLICATION FILED OCT. 31, 1919.

1,378,027.

Patented May 17, 1921.

Inventor
William I. Harp.

By D. Swift
his Attorney

UNITED STATES PATENT OFFICE.

WILLIAM ISAAC HARP, OF GALAX, VIRGINIA, ASSIGNOR OF ONE-THIRD TO JOHN LINN AND ONE-THIRD TO R. B. TODD, OF GALAX, VIRGINIA.

NON-SKID-CHAIN TIGHTENER AND ADJUSTER.

1,378,027.  Specification of Letters Patent.  Patented May 17, 1921.

Application filed October 31, 1919. Serial No. 334,634.

*To all whom it may concern:*

Be it known that I, WILLIAM I. HARP, a citizen of the United States, residing at Galax, in the county of Grayson, State of Virginia, have invented a new and useful Non-Skid-Chain Tightener and Adjuster; and I do hereby declare the following to be a full, clear, and exact description of the invention, such as will enable others skilled in the art to which it appertains to make and use the same.

The invention relates to tighteners for non skid chains for automobile wheels, and has for its objects to provide coil spring means interposed between chain sections, said chain sections being provided with hooks adapted to engage links in the non skid chain at various points after the springs have been stretched, thereby allowing the springs to contract so that slack in the non skid chain will be taken up and the non skid chain caused to closely engage the tire, at all points of the tread thereof.

A further object is to provide a coil spring means whereby the slack in a non skid chain may be taken up, thereby eliminating and reducing the wear upon the links of the chain to a minimum, also preventing objectionable noise and reducing the chances of the transverse sections of parts of the non-skid chain from becoming entangled in the roadbed, thereby breaking the non skid chain.

With the above and other objects in view the invention resides in the combination and arrangement of parts as hereinafter set forth, shown in the drawings and claimed, it being understood that changes in the precise embodiment of the invention may be made within the scope of what is claimed without departing from the spirit of the invention.

In the drawings:—

Figure 1:
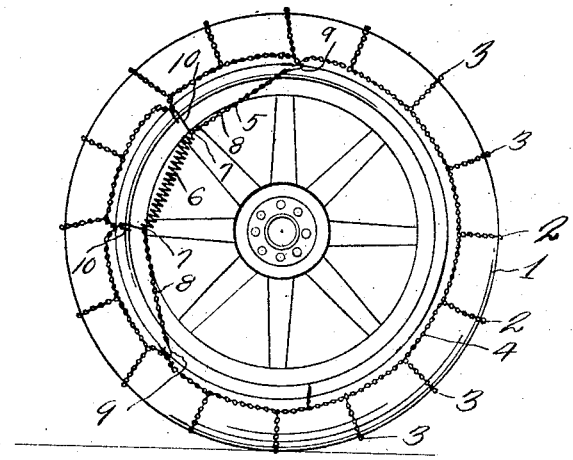
Figure 1 is a side elevation of an automobile wheel showing the non-skid chain tightener applied thereto.

Referring to the drawings the numeral 1 designates a tire of an automobile wheel and 2 a non skid chain applied thereto, said non skid chain comprising transversely disposed members 3 and circumferential marginal chain members 4.

The non skid chains 2 are generally loose upon the tire, thereby causing a great deal of noise when the transverse portions 3 become in engagement with the ground, and when the chains are extremely loose they engage during rotation with the under surfaces of the fender, thereby making noise. When the chains are extremely loose the wear upon the same is great because there is a grinding action incident to the looseness of the links, which grinding action soon wears through the links, therefore to avoid these disadvantages a tire chain tightener 5 is provided.

Referring to the tightener as shown in Fig. 1, it will be seen that the same comprises a coil spring 6, said coil spring having connected to the ends thereof as at 7 sections of chain 8, said sections having secured to their ends hooks 9 which hooks are adapted to be hooked in the circumferential marginal chain 4, after which the operator grasps the hooks 10 and pulls outwardly on the same until the coil spring 6 has been stretched, then he places the hooks 10 in engagement with any of the links in the marginal circumferential chain 4, thereby when releasing the hooks 10 allowing the spring 6 to contract and take up the slack in the non skid chain.

Figure 2:
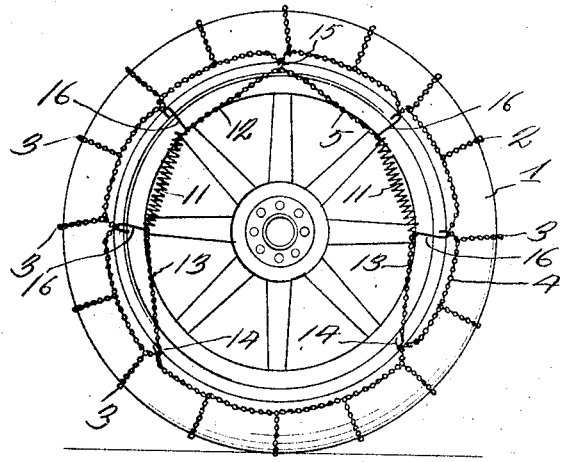
Fig. 2 is a side elevation of an automobile wheel showing another form of non-skid tightener applied thereto, in which tightener two coil springs are used.

Referring to Fig. 2 it will be seen that two coil springs 11 are provided, said coil springs being connected together at one of their ends by a chain 12, the other end of said coil springs having connected thereto sections of chain 13, the free ends of which are provided with hooks 14, which hooks are adapted to be hooked in any of the links of the chain 4, one hook on each side of a diametrical line drawn through the wheel. After hooks 14 have been hooked, the hook 15 carried at an intermediate point between the ends of the coil springs and by the chain 12 is hooked in the chain 4. After the chain tightener is in this position the hooks 16 adjacent the ends of the spring are pulled outwardly thereby stretching the coil springs 11, then the hooks 16 are hooked in any of the links of the chain 4. After hooks 16 have been hooked and the operator has released the same, coil springs 11 will contract, thereby taking up the slack in the non-skid chain as a whole. said taking up of the slack being substantially around the circumference of the non-skid chain.

From the above it will be seen that a non skid chain tightener is provided wherein it will be possible to easily and quickly apply the same, and one wherein the action is positive and the slack is taken up completely.

The invention having been set forth what is claimed as new and useful is:—

A tire chain tightener comprising chain sections, said chain sections having their adjacent ends secured to the ends of a coil spring, hooks at the free ends of the chains adapted to be hooked into the tire chain at points spaced from each other, and hooks carried by the chains adjacent the ends of the spring and angularly disposed and adapted to be hooked into the tire chain at points intermediate the first named hooks thereby stretching said coil spring and allowing said spring to take up the slack in the tire chain.

In testimony whereof I have signed my name to this specification in the presence of two subscribing witnesses.

WILLIAM ISAAC HARP.

Witnesses:
 PLATT A. HARP,
 J. E. TODD.